United States Patent [19]

Dahlberg

[11] Patent Number: 4,914,544
[45] Date of Patent: Apr. 3, 1990

[54] AIRFIELD MARKER LIGHT

[76] Inventor: Anders I. Dahlberg, Flyghamnsvägen 22, S-183 64 Täby, Sweden

[21] Appl. No.: 297,281
[22] PCT Filed: Jul. 6, 1987
[86] PCT No.: PCT/SE87/00322
§ 371 Date: Jan. 9, 1989
§ 102(e) Date: Jan. 9, 1989
[87] PCT Pub. No.: WO88/00157
PCT Pub. Date: Jan. 14, 1988

[30] Foreign Application Priority Data

Jul. 7, 1986 [SE] Sweden .................................. 8603027

[51] Int. Cl.⁴ .............................................. F21V 5/04
[52] U.S. Cl. .................................. 362/153.1; 362/309; 362/331; 362/337; 362/364
[58] Field of Search ............... 362/145, 153, 364, 308, 362/309, 331, 332, 337, 153.1; 340/947, 953, 954

[56] References Cited

U.S. PATENT DOCUMENTS

| 3,096,024 | 7/1963 | Young | 362/364 |
| 4,161,770 | 7/1979 | Maurer | 362/309 |
| 4,382,274 | 5/1983 | De Backer et al. | 362/153 |
| 4,393,440 | 7/1983 | Yperman | 362/153 |

FOREIGN PATENT DOCUMENTS

| 805529 | 2/1969 | Canada | 362/308 |
| 22106 | 1/1981 | European Pat. Off. | 362/364 |
| 1191767 | 4/1962 | Fed. Rep. of Germany | 362/364 |
| 6710769 | 4/1968 | Netherlands | 362/364 |
| 730227 | 5/1955 | United Kingdom | 362/308 |
| 966357 | 8/1964 | United Kingdom | 362/308 |

Primary Examiner—Ira S. Lazarus
Assistant Examiner—Richard R. Cole
Attorney, Agent, or Firm—Pollock, Vande Sande & Priddy

[57] ABSTRACT

An airfield marker light, comprising a casing to be flush-mounted in the ground and having a lower light source (4), an upper, a transparent cover plate (8) lying substantially in the ground plane M, and a refractive member (7) which divides the light bundle from the light source, so that two light beams ($L_{12}$, $L_{34}$) are emitted from the upper surface of the cover plate (8) in opposite directions at a small angle to the ground plane. The light source (4) emits a collected, substantially vertical light bundle, and the refractive member includes a light dividing prism (7) situated between the light source and the cover plate and having refractive planar surfaces (7a, 7b, 7c, 7d) obliquely oriented in opposite directions, so that the vertical light bundle is divided into two light bundle portions, directed obliquely upwardly in oppoiste directions, the light bundle portions upon passage through the cover plate being refracted in opposite directions in the upper surface (8a, 8b) of the cover plate.

10 Claims, 2 Drawing Sheets

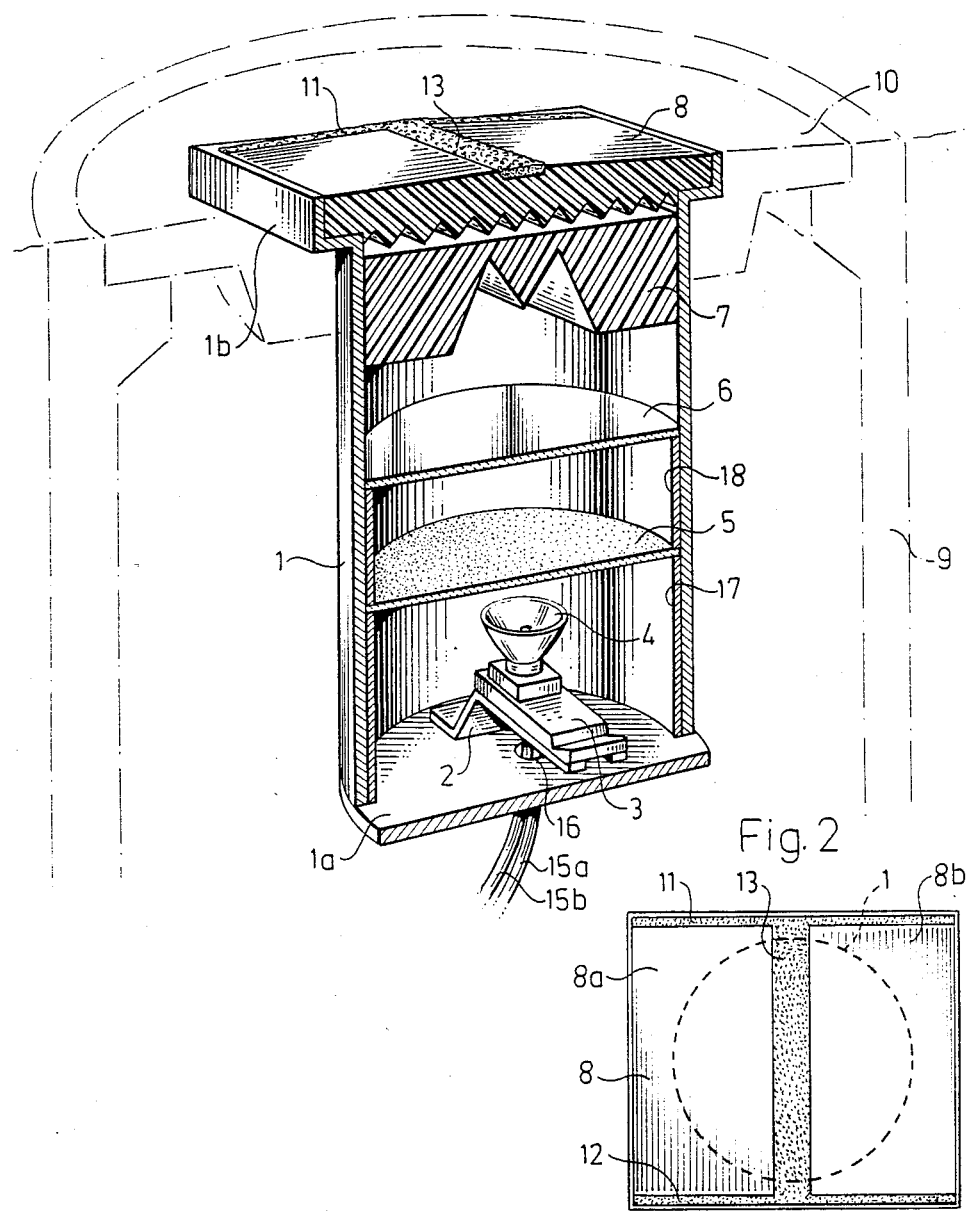

AIRFIELD MARKER LIGHT

FIELD OF THE INVENTION

The invention relates to an airfield marker light, e.g for runways or taxi strips. The marker light is of the flushmounted type and provides light beams directed in opposite directions at a small angle with the ground.

BACKGROUND OF THE INVENTION

Such a marker light is known from GB-A-966-357, wherein the light from a lower, non-directive light source strikes, on the one hand, two part-cylindrical collecting lenses each positioned adjacent to a saw-tooth surface, these lenses serving to focus the light into a respective light bundle with parallel rays, and on the other hand, somewhat curved reflector surfaces, located at the bottom adjacent to the side walls of the casing, these reflector surfaces serving to reflect the light toward the saw-tooth surfaces of the cover plate. With this arrangement, it is difficult to prevent a large portion of the light from striking the saw-tooth surfaces at an oblique angle with an accompanying total reflection, absorption and heat development in the cover plate. This is also due to the fact that each collecting lense co-operates with no more than two saw-tooth surfaces and that the light source has a large radial extension in relation to its distance from the collecting lenses and the reflector surfaces. Consequently, this marker light provides a relatively low light efficiency and, if the power of the light source is increased, the heat development will be too high.

A similar marker light is known from DK-C-113912, wherein a lower, point-like source emits non-directive light, which hits an upper, transparent cover plate having an upper planar surface and an incident surface, which has the shape of a toroid and which is discontinued by two diametrically opposed collecting lenses or planar cylinder lenses, the latter collecting the light into two light beams emitted from the upper surface of the cover plate in opposite directions. Even in this structure, the heat development will be strong, and it is therefore hardly useful in practical applications, since the required light intensity cannot be achieved.

Other examples of previously known marker lights of the flush-mounted type, although emitting light in only one main direction, are given in EP-B1-22106 and US-A-3 096 024, these two lights including a transparent cover plate having a planar upper surface and a saw-tooth lower surface. The light source is obliquely positioned, in this case so that its light bundle strikes one of the surfaces of each saw-tooth at a substantially right angle. In principle, these known lights can be supplemented by a second light source, inclined in an opposite direction, so that two oppositely directed light beams are obtained. However, such an arrangement is disadvantageous because of the complications involved in arranging two separate light sources, and because of the increased heat development caused by another light source.

SUMMARY OF THE INVENTION

The object of the invention is to achieve a marker light having only one light source and ensuring a division of the light bundle into two oppositely directed, sufficiently strong light beams with moderate heat development, in a structure which is fairly simple and relatively inexpensive to manufacture.

This object is achieved for a marker light according to the invention, which is characterized in that (a) the light source is adapted to emit a collected upwardly directed light bundle, and (b) the optical means include a light dividing prism in the form of a transparent plate body located between the light source and the cover plate and having oppositely inclined, refractive planar surfaces, so that the upwardly directed light bundle from the light source, during its passage through the light dividing prism, is divided into two obliquely upwardly directed light bundles propagating in opposite directions at right angles to the respective saw-tooth surfaces.

By this structure, the light energy generated by the light source is utilized to a very great extent as useful, emerging light, whereas only a minor part thereof is converted into heat. Moreover, the upper cover plate, which is exposed to mechanical forces, is thermally protected by the underlying light dividing prism. However, the most important feature is that it is possible to obtain substantially higher light intensity, with moderate heat development, than with the previously known solutions.

The light efficiency can be be especially high by adapting the light dividing prism to emit two mutually partially overlapping light bundles. If desired, practically the whole cover plate can then be utilized for light emission. A further increase of the light intensity near the ground level can be achieved in that the upper surface of the cover plate includes two portions slightly inclined in opposite directions and each emitting a light beam.

The marker light may be designed for narrow emitted light beams, diametrically opposed, which is preferable at straight portions of a runway, or for wider light beams, obliquely directed sideways, which is preferable at curved portions of a taxi strip or the like.

BRIEF DESCRIPTION OF THE DRAWINGS

The invention will be explained more fully below with reference to the appended drawings, which illustrate a preferred embodiment by way of example, and in which FIG. 1 shows a marker light according to the invention in perspective view, half of the device being cut away through a central, vertical section for increased clarity;

FIG. 2 shows the marker light in top plan view;

DESCRIPTION OF PREFERRED EMBODIMENTS

Figure 3:
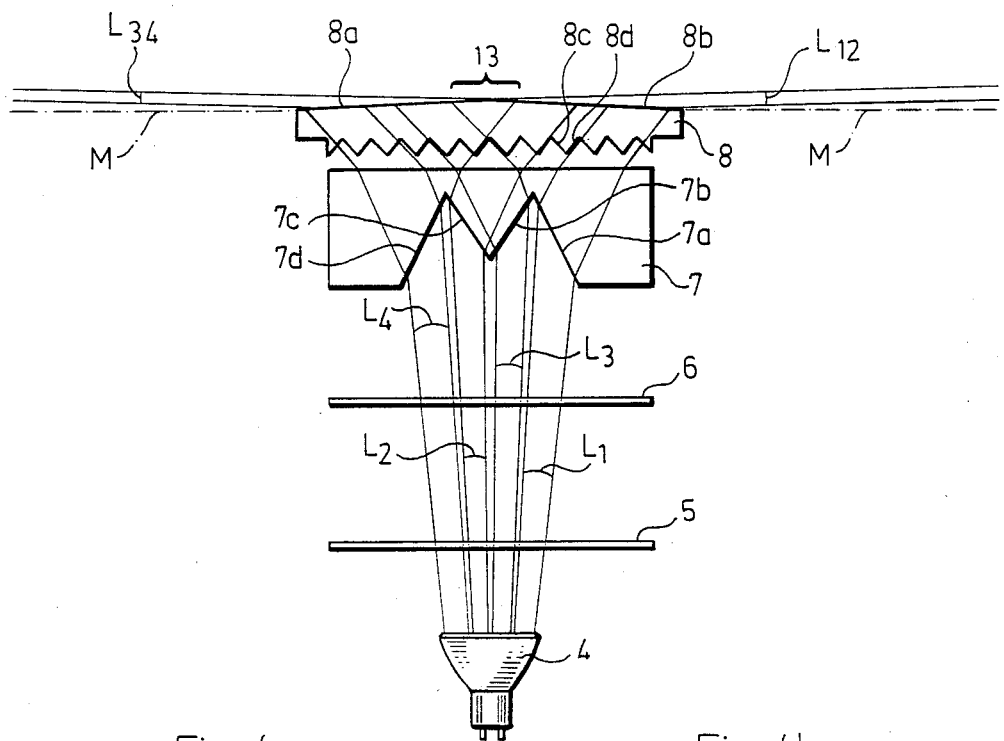
FIG. 3 shows the optical components schematically with the principal light rays.

The marker light shown in FIGS. 1 and 2 comprises an essentially cylindrical casing 1 of metal, e.g., an aluminum alloy, having a bottom plate 1a and an upper, substantially rectangular seat 1b a reflector lamp 4, mounted on the bottom plate 1a by means of a bracket 2, with a mounting plate 3, a color filter 5, a transparent heat insulating plate 6, a refractive plate 7, and an upper transparent cover plate 8 tightly mounted in the seat 1b. As shown in FIG. 1, the casing 1 is disposed in a well housing 9 having a lid 10, so that the upper surface of the cover plate 8 lies substantially flush with the ground plane. The upper, substantially rectangular cover plate 8 is preferably made of a transparent epoxy plastic material, i.e., an abrasive resistant material, which, if necessary, can be provided with a new surface layer for filling in possible scratches or repairing other damage on the upper surface. However, to avoid such damage, hard, ceramic particles are partially embedded into the surface layer partly along two longitudinal edge portions 11, 12, partly along a central, transverse strip portion 13. Hereby, the upper surface of the cover plate is divided into two rectangular portions 8a, 8b each intended to emit a light beam, which propagates close to the plane of the ground (cf. FIG. 3). In order to achieve the best possible light intensity near the plane of the ground, each surface portion 8a, 8b is somewhat inclined, so that it inclines downwards from the central transversal portion 13 about 3° relative to the horizontal plane.

The mounting bracket 2 for the reflector lamp 4 consists of a bent metal strip, e.g., of an aluminum alloy, which is oriented substantially parallel to the transversal central portion 13 of the cover plate 8. One end portion 2a of the bracket is fixed to the bottom plate 1a, which likewise can be made of an aluminum alloy, in good heat conductive contact with latter. The other, longer end portion 2b is planar and horizontal, and the rectangular mounting plate 3 is secured to this portions by a screw fastener 14. The reflector lamp 4 with its socket 4a can be mounted on the plate 3 either in a central, straight upwardly directed position according to FIG. 4a or in a somewhat oblique (in a plane through the central transversal portion 13 of the cover plate 8) position in a corresponding recess 3a in the plate, as appears from FIG. 4b. The electrical feeder wires 15a, 15b of the lamp 4 are drawn through a central hole 16 in the bottom plate 1a, as appears from FIG. 1. The color filter 5, which is disposed somewhat above the reflector lamp 4, is made of a toughened glass plate with coloring pigment, the glass plate 5 being horizontal and all around sealingly fitted circumferentially to the cylinder casing 1. The circumferential portion thereof is secured between two cylindrical lower and upper tube portions 17, 18, likewise of an aluminum alloy, said tube portions being tightly fitted internally in the tube casing 1.

The insulating glass plate 6 is likewise horizontal and rests on the upper end of the upper tube portion 18, the circumferential edge thereof being fitted sealingly to the surrounding tube casing 1.

The refractive plate 7 is likewise horizontally disposed and is sealingly fitted to the surrounding tube casing 1 at a small distance below the upper cover plate 8.

A portion of the heat generated by the reflector lamp 4 is dissipated by heat conduction via the socket 4a, the plate 3, the bracket 2 and the bottom plate 1a, and a portion of the heat generated during the passage of the light through the plates 5, 6 and 7 is dissipated by way of the heat conductive contact with the tube casing 1. The insulating glass plate 6 also serves to prevent upward movement of heat by convection. Thus, the upper cover plate 8 can be maintained at an advantageously low temperature, whereby its resistance is increased and the life of the marker light is substantially increased in relation to prior art solutions.

The optical features will now be described with reference to FIG. 3.

The vertically directed reflector lamp 4 emits a well defined, collected light bundle, which in ground marker lights intended for straight portions of a runway or a taxi strip diverges about 10° at most, as appears from the longitudinal section in FIG. 3. Since the plates 5 and 6 are parallel, the light bundle passes through these plates without any geometrical change. The refractive plate 7, however, is provided with inclined surfaces 7a, 7b, 7c and 7d, and thus serves as a light refracting prism, which divides the light bundle into two bundle portions $L_1$, $L_2$ and $L_3$, $L_4$, respectively, directed obliquely upwardly in opposite directions (between the light refracting plate 7 and the cover plate 8). The underside of the cover plate 8 is saw-tooth shaped in the transversal direction (parallel to the portion 13 at the upper side), wherein each saw-tooth has an oblique saw-tooth surface 8c, which is normal to the oblique light bundle portion $L_1$, $L_2$, and an adjoining inclined saw-tooth surface 8d, which is normal to the other oblique light bundle portion $L_3$, $L_4$. The two oblique light bundle portions will therefore strike the underside of the cover plate without refraction, whereupon each light bundle portion is heavily refracted in the respective upper surface portions 8a and 8b, so that the emitted light beams $L_{12}$ and $L_{34}$ are directed longitudinally in opposite directions at a very small angle to ground plane M (dash-dotted in FIG. 3). It should be noted that no light strikes the upper transversal portion 13 of the cover plate, in which hard particles are embedded (cf. FIg. 2).

To achieve the desired light efficiency, it is preferble that the light refractive plate 7 be so designed and positioned adjacent to the cover plate 8 that the obliquely upwardly directed light bundle portions, namely, the bundle portions $L_2$ and $L_3$, partially overlap each other. For this purpose, the light refractive plate 7 is situated at a small distance between its upper, planar surface and the lower, saw-tooth surface of the cover plate 8. Furthermore, the refractive plate 7 includes two outer incident surfaces 7a, 7d obliquely oriented in opposite directions, and two inner incident surfaces 7b, 7c located therebetween and likewise oriented obliquely in opposite directions. The four incident surfaces 7a, 7b, 7c and jointly 7d adjoin each other and form the shape of the letter M with oblique legs. The surfaces 7a and 7c are mutually parallel and refract the bundle portions $L_1$ and $L_2$, respectively, which together form the emitted light beam $L_{12}$ upon being further refracted in the surface portion 8b of the cover plate. The surfaces 7b and 7d are likewise mutually parallel and refract the bundle portions $L_3$ and $L_4$, so that the latter bundle portions, upon refraction in the upper surface portion 8a of the cover plate, form the oppositely directed light beam $L_{34}$. If desired, additional oblique surfaces corresponding to the surfaces 7b and 7c can be formed between the outer oblique surfaces 7a and 7d, e.g. in a saw-tooth pattern corresponding to the underside of the cover plate 8. For optimum light efficiency, the intermediate oblique surfaces (7b, 7c) should have a vertical extension which is less than that of the outer oblique surfaces 7a and 7d.

In principle, the light refractive plate 7 could be replaced by separate prisms with corresponding oblique surfaces, but a unitary plate is preferable for easy mounting and efficient heat transfer to the surrounding casing.

Figure 4A:
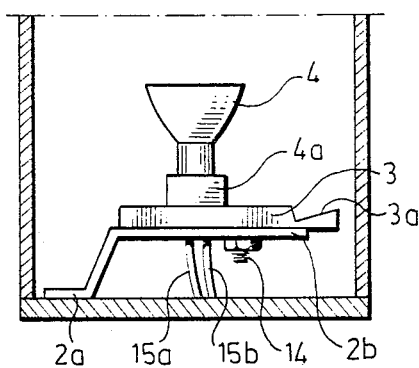
FIGS. 4a and 4b show central sectional views of the lower part of the marker light with a lamp in two mounting positions.

The light rays according to FIG. 3 correspond to the location of the reflector lamp 4 according to FIG. 4a. If the reflector lamp 4 is obliquely positioned as shown in FIG. 4b, the light rays will be substantially the same as those in FIG. 3, since the reflector lamp 4 is inclined only in a transversal plane (normal to the drawing plane in FIG. 3).

Figure 4B:
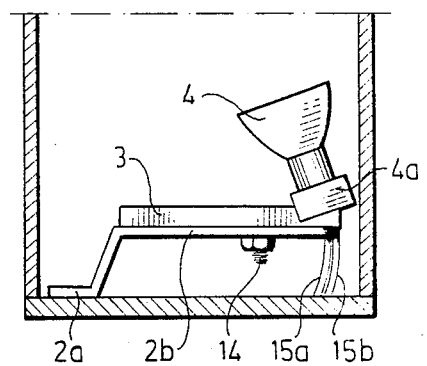

Thus, the oblique position according to FIG. 4b will only result in that the light beams $L_{12}$ and $L_{34}$ are turned somewhat sideways; this position can be used, e.g., in curved sections of a taxi strip. If desired, the reflector lamp 4 can be provided with reflector which produces a somewhat wider light bundle, e.g., diverging up to 50°, so that the spread sideways is correspondingly increased. The spread in the central longitudinal plane according to FIG. 3, however, will not be increased since the light rays, which diverge more than about 5° from the vertical will be more inclined between the light refracting plate 7 and the cover plate 8, so that they are refracted in the outer incident surfaces 7a and 7d and are totally reflected in the upper surface portions 8a, 8b of the cover plate 8. If it is desired to reduce the heat which is hereby generated by the absorption of light in the cover plate 8, one can use a reflector which spreads the light bundle up to 50° sideways but only about 10° in the longitudinal direction.

I claim:

1. An airfield marker light comprising a casing (1) to be flush-mounted in the ground and having
   (a) at least one lower light source (4) adapted to emit a collected, upwardly directed light bundle; and
   (b) an upper, at least partially transparent cover plate (8) with a lower saw-toothed surface (8c, 8d) and an upper, substantially planar surface (8a, 8b), said cover plate, upon lowering of said casing into the ground (M), being substantially flush with a plane of said ground; and
   (c) optical means (7) adapted to direct light from said light source in such a way that two well-defined light beams ($L_{12}$, $L_{34}$) are emitted from said upper surface of said cover plate (8) in opposite directions at a small angle with said ground plane (M), said optical means comprising a light dividing prism in the form of a transparent plate body (7) located between said light source and said cover plate and having oppositely inclined, refractive planar surfaces (7a, 7b, 7c, 7d), whereby said upwardly directed light bundle from said light source (4), during its passage through said light dividing prism, is divided into two obliquely upwardly directed light bundles propagating in opposite directions at right angles to respective saw-tooth surfaces (8c, 8d).

2. Marker light according to claim 1, wherein said light dividing prism (7) is adapted to emit two obliquely upwardly directed, partially overlapping light bundles.

3. Marker light according to claim 1, wherein said plate body (7) is horizontally disposed with an upper planar surface and lower, symmetrically situated incident surfaces (7a, 7b, 7c, 7d) obliquely oriented in opposite directions.

4. Marker light according to claim 3, wherein said incident surfaces include two outer incident surfaces (7a, 7d) obliquely oriented in opposite directions and at least two inner incident surfaces (7b, 7c) located therebetween and being likewise obliquely oriented in opposite directions.

5. Marker light according to claim 4, wherein each of said outer incident surfaces (7a, 7d) adjoins a corresponding one of two inner, mutually adjoining incident surfaces (7b, 7c).

6. Marker light according to claim 5, wherein said inner and outer incident surfaces (7a, 7b, 7c, 7d) jointly form the shape of a letter M with oblique legs.

7. Marker light according to claim 4, wherein said outer incident surfaces (7a, 7d) have a greater vertical extension than said inner incident surfaces (7b, 7c).

8. Marker light according to claim 1, wherein said upper surface of said cover plate (8) comprises two portions (8a, 8b) slightly inclined in opposite directions and each emitting a corresponding one of said two light beams ($L_{12}$, $L_{34}$).

9. Marker light according to any one of claims 1 to 8, wherein said light source (4) is provided with a reflector producing an emitted, vertical light bundle which diverges at most 10°.

10. Marker light according to any one of claims 1 to 8, wherein said light source (4) is obliquely adjustable sideways and is provided with a reflector producing a light bundle which diverges at most 50°.

* * * * *